United States Patent [19]
Ross

[11] Patent Number: 5,418,576
[45] Date of Patent: May 23, 1995

[54] TELEVISION RECEIVER WITH PERCEIVED CONTRAST REDUCTION IN A PREDETERMINED AREA OF A PICTURE WHERE TEXT IS SUPERIMPOSED

[75] Inventor: Kevin Ross, Halifax, England

[73] Assignee: U. S. Philips Corporation, New York, N.Y.

[21] Appl. No.: 308,471

[22] Filed: Sep. 19, 1994

Related U.S. Application Data

[63] Continuation of Ser. No. 8,931, Jan. 26, 1993, abandoned.

[30] Foreign Application Priority Data

Jan. 27, 1992 [GB] United Kingdom ............... 9201837

[51] Int. Cl.⁶ ..................... H04N 5/57; H04N 9/74
[52] U.S. Cl. ............................. 348/686; 348/589
[58] Field of Search ............. 348/678, 686, 687, 597, 348/589, 586, 578; 345/144; H04N 9/74

[56] References Cited

U.S. PATENT DOCUMENTS

| | | | |
|---|---|---|---|
| 3,903,517 | 9/1975 | Hafner | 358/180 |
| 4,301,473 | 11/1981 | Wallace et al. | 348/634 |
| 4,356,511 | 10/1982 | Tsujimura | 348/597 |
| 4,451,840 | 5/1984 | Shanley | 358/169 |
| 4,549,217 | 10/1985 | Sendelweck | 358/169 |
| 4,549,218 | 10/1985 | Norley | 358/169 |
| 4,860,106 | 8/1989 | Taupin et al. | 348/589 |
| 5,017,143 | 5/1991 | Backup | 358/142 |
| 5,249,050 | 9/1993 | Zato | 358/147 |

FOREIGN PATENT DOCUMENTS

| | | | |
|---|---|---|---|
| 091868 | 10/1983 | European Pat. Off. | 358/169 |
| 0449106 | 10/1991 | European Pat. Off. | |
| 0486129 | 5/1992 | European Pat. Off. | |
| 106477 | 8/1981 | Japan | H04N 5/22 |
| 114681 | 7/1983 | Japan | 358/142 |
| 0082582 | 4/1986 | Japan | H04N 5/278 |
| 223284 | 9/1990 | Japan | H04N 5/278 |
| 260982 | 10/1990 | Japan | H04N 5/278 |
| 0001777 | 1/1991 | Japan | H04N 5/278 |
| 4277987 | 10/1992 | Japan | H04N 5/45 |

OTHER PUBLICATIONS

IEE Standard Dictionary of Electrical and Electronic Terms pp. 106, 188.

"LSI Chip Set For Closed Caption Decoder System", by Harigai et al, IEEE Transactions on Consumer Electronics, 37 (1991) Aug., No. 3, pp. 449–454.

Primary Examiner—James J. Groody
Assistant Examiner—Chris Grant
Attorney, Agent, or Firm—Steven R. Biren

[57] ABSTRACT

The television receiver includes a text generation mechanism which is capable of superimposing text on a received picture. In order to make the text more legible, while still retaining picture information a reduced contrast area is formed around the text. In order to superimpose the text on the picture text, RGB signals are applied to the video output circuits together with a switching signal (VDS) which causes either text or picture signals to be applied to the display device. To provide a reduced contrast area around the text display the switching signal (VDS) is arranged to switch between the picture signal and blanking level at a fast rate, for example at the clock rate, to produce the reduced contrast area.

13 Claims, 2 Drawing Sheets

TELEVISION RECEIVER WITH PERCEIVED CONTRAST REDUCTION IN A PREDETERMINED AREA OF A PICTURE WHERE TEXT IS SUPERIMPOSED

This is a continuation of application Ser. No. 008,931, filed Jan. 26, 1993 now abandoned.

BACKGROUND OF THE INVENTION

The invention relates to a television receiver comprising means for superimposing text on a received television picture, the text being contained within a predetermined area of the display, and means for reducing the contrast of the received picture within the predetermined area.

There are a number of reasons for wishing to superimpose text on a television picture display. It is known to provide, for example on screen message displays to help a viewer select a particular channel or to help in the adjustment of picture contrast, brightness etc. Another form of superimposed text is for the production of sub-titles for the deaf. The subtitles may be transmitted as teletext signals or as data on line 21 of the television signal as in the United States of America. Teletext decoders may also allow the superimposition of a full page of text on a television picture as used in the MIX mode form. MIX mode teletext displays may, depending on the picture content, be difficult to read as the characters may merge into the picture. The same problem could occur with sub-titles and to prevent this it has been specified by the U.S. Federal Communications Committee that the sub-titles appear on a solid black background. This solution is, of course, impossible to implement with MIX mode teletext and, depending on the length of the message, may be impractical with on-screen display messages. In addition even with subtitles the provision of a black box around the subtitle will obscure part of the picture and this may impair the enjoyment of the viewer.

A proposal to overcome the problem of the difficulty of reading text superimposed on a picture is to provide a reduced picture contrast box to contain the text rather than a solid black box. This enables some retention of the picture information presented to the view but causes the text to stand out more distinctly against the background. Japanese Patent Application No. 61-99489 discloses a television receiver in which the contrast of the received picture signal is reduced in an area of the display where the text is to be displayed before the text is superimposed thereon. The area defined extends over a plurality of scanning lines. When producing on screen display messages or sub-titles it may be that only a single character is displayed at one time. Under such circumstances it is not desirable to reduce the picture contrast across the whole width of the display screen. The use of an arrangement such as that shown in the above referenced Japanese Patent Application requires the gain of the luminance control circuit to be switched very quickly and this may be difficult to achieve since it usually involves the charging or discharging of a capacitor. Such an arrangement is not feasible for switching the gain of analogue circuits at a sufficient rate to change the contrast within a television line.

SUMMARY OF THE INVENTION

It is an object of the invention to enable the display of text superimposed on a picture where an improvement of the legibility of the text is achieved by effectively reducing the contrast of the picture in an area surrounding the text and where the area of reduced contrast may be limited to less than the full width of the display screen.

In the context of this description and the claims appended hereto the term text includes alpha-numeric characters, ideograms, pictograms, sprites, icons, and the like.

The invention provides a television receiver as set forth in the opening paragraph characterized in that the contrast reduction means comprises means for causing a predetermined pattern of pixels of the received picture within the predetermined area to be switched to a constant background color.

This may be achieved by switching the text source to the video output circuits for selected pixels within the predetermined area where character pixels are not being written. At this time the text source will have output values corresponding either to the blanking level (black) or to a selected background color, for example if the text was to be superimposed on a selected background color. Since this switching means is already present and is designed to operate at the pixel rate the area surrounding the text can be tailored closely to the amount of text displayed and need not extend over the whole width of the display screen.

The predetermined pattern may be a checker-board pattern and each square may be formed by a single pixel. This appears to give the least obtrusive display in that the pattern of black pixels is least noticeable.

In such a television receiver the superimposed text may be a sub-title transmitted as a data signal during blanking intervals in the transmitted television signal, the receiver including a decoding arrangement for said data signals, wherein the text forming the sub-title is contained within a defined area and the contrast reducing means is effective to reduce the contrast of the received picture within the defined area.

The defined area may be for example one character space wider than the sub-title at each horizontal end. This gives a minimum three character size box if a single size character is displayed. By forming the contrast reduced area in this way a minimum disruption of the displayed picture is obtained.

BRIEF DESCRIPTION OF THE DRAWINGS

The foregoing and other features and advantages of the invention will become apparent from the following description of an exemplary embodiment of the invention with reference to the accompanying drawings, in which.

DESCRIPTION OF THE PREFERRED EMBODIMENTS

Figure 1:
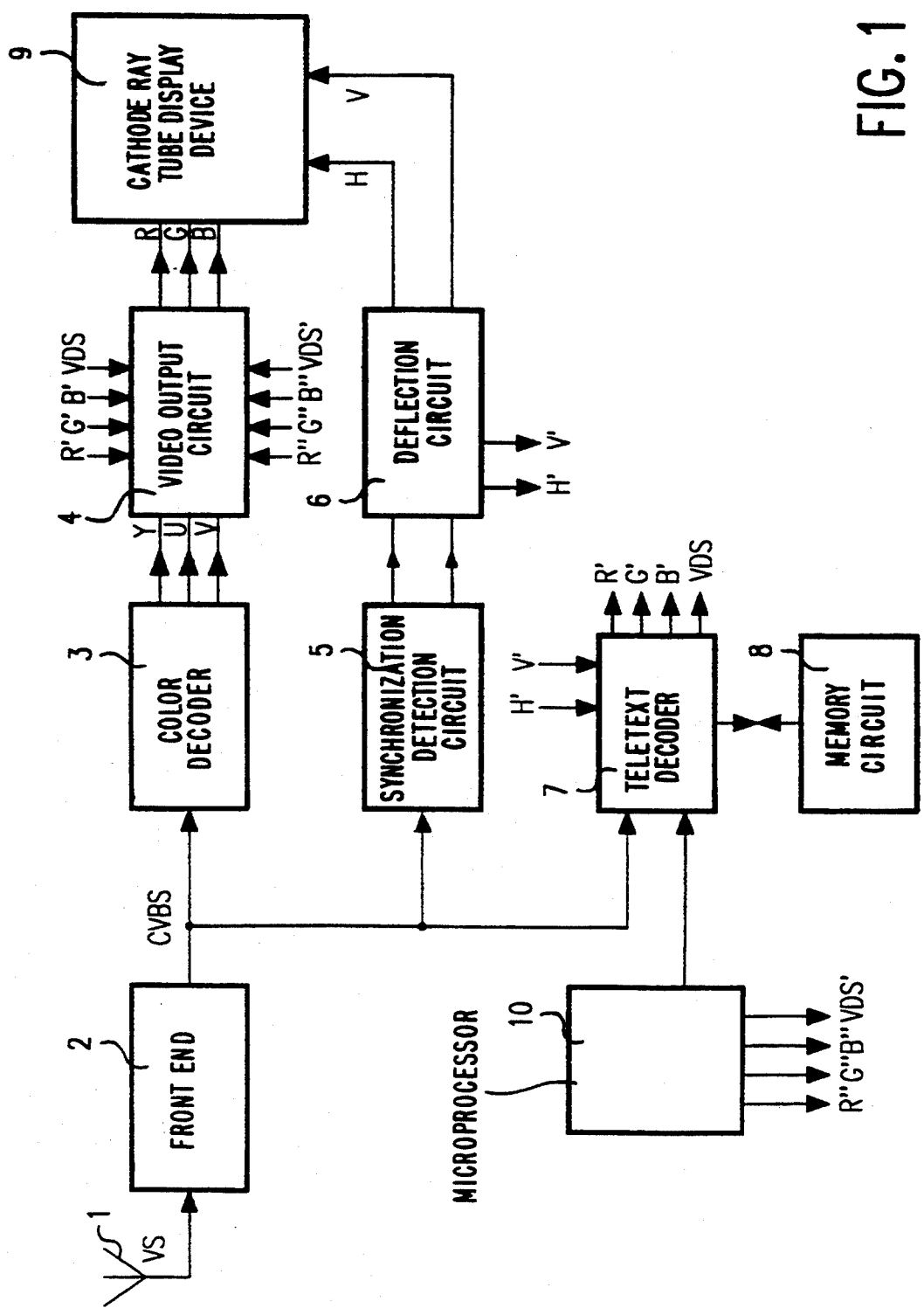
FIG. 1 is a block schematic diagram of a television receiver according to the invention.

The television receiver shown in FIG. 1 comprises an aerial 1 for receiving a transmitted television signal and coupling it to the front end 2 of the receiver which comprises the usual amplifying, tuning, intermediate frequency detection and demodulation circuits. The front end 2 receives a video signal VS and produces at its output a composite video and blanking signal CVBS. The signal CVBS is applied to a color decoder 3 which produces luminance and color difference signals Y, U, V which are fed to a video output circuit 4. The signal CVBS is also fed to a synchronization detection circuit 5 which produces vertical V and horizontal H flyback pulses for application to line and field time base and deflection circuits 6. The signal CVBS is additionally fed to a teletext decoder 7 having associated therewith a memory circuit 8. The teletext decoder 7 is arranged to decode data signals sent on lines during the field blanking interval as is well known. The teletext decoder 7 also receives inputs H' and V' from the deflection circuit 6 from which it derives timing information, the inputs H' and V' being line and field synchronizing pulses produced by the line and field timebase circuits.

The teletext decoder 7 produces signals R', G', B' which define the pixel values for each pixel of a generated character and these signals R', G' and B' are fed to the video output circuits 4 together with a signal VDS which defines whether text or picture information is fed to outputs R, G, B of the video output circuit 4. The outputs R, G, B of the video output circuit 4 are fed to a cathode ray tube display device 9 together with the vertical and horizontal deflection currents from the deflection circuits 6.

The teletext decoder 7 may have an input for receiving commands from a remote control device operated by the viewer or may be controlled by an external microprocessor 10 which controls, in addition, other functions of the receiver such as channel selection, contrast, brightness, sound volume, etc. The microprocessor 10 may also create on-screen displays to aid the viewer in adjustment of controls and selection of functions. To enable it to do so the microprocessor 10 will have connections to appropriate sections of the television receiver, for example to the front end 2 to effect channel selection, to the video output circuits 4 to control contrast and brightness, and to the teletext decoder 7 to select text, picture or mix modes and to select the appropriate page to be displayed.

The microprocessor 10 may also produce outputs R", G", B" which are fed to the video output circuits 4 together with a signal VDS' to enable the display of on-screen display messages generated by the microprocessor.

Figure 2:
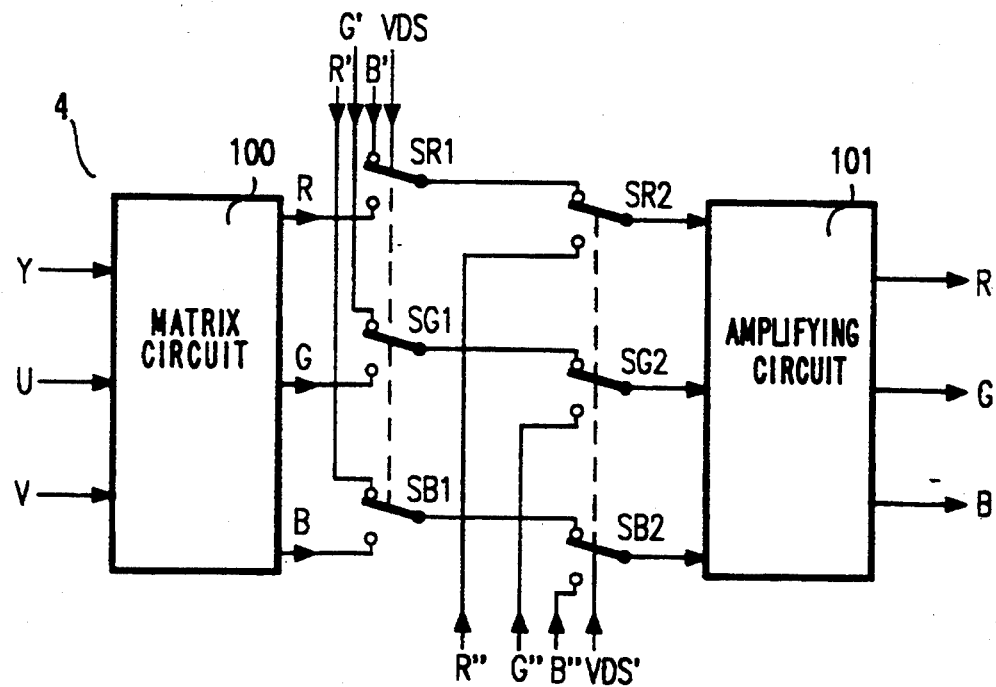
FIG. 2 shows one embodiment of a video output circuit for use in the television receiver shown in FIG. 1.

FIG. 2 shows in greater detail one embodiment of the video output circuits 4 used in the television receiver of FIG. 1. As shown in FIG. 2 input luminance Y and color difference U,V signals are applied to a matrix circuit 100 which converts them into three signals R, G, B which are fed to first contacts of respective changeover switches SR1, SG1 and SB1. The other contacts of switches SR1, SG1, and SB1 receive the signals R', G', and B' from the teletext decoder 7. The state of the switches SR1, SG1, and SB1 is controlled by the signal VDS to enable selection between the picture signal R,G,B and the text signal R', G', B'. The poles of switches SR1, SG1, SB1 are connected to first contacts of respective changeover switches SR2, SG2 and SB2. The other contacts of switches SR2, SG2 and SB2 receive the signals R", G", B" from the microprocessor 10. The state of the switches SR2, SG2, and SB2 is controlled by the signal VDS' generated by the microprocessor 10 to enable selection between the on-screen display signal R", G", B" and the signal at the poles of changeover switches SR1, SG1 and SB1. The poles of switches SR2, SG2 and SB2 are connected to amplifying circuit 101 which produce the R,G, and B signals for application to the display device. The amplifying circuits 101 may include the usual viewer adjustable controls such a contrast and brightness. This contrast control will of course act on both the picture and any superimposed text and should not be confused with the effectively reduced contrast in the defined area produced by this invention, which reduced contrast is independent of any change in the overall contrast of the displayed picture and text.

The limited area reduced contrast is produced by switching the signal VDS (or VDS') at a fast rate, for example the pixel rate, and causing only some of the picture pixels to be selected within the defined text area. Normally teletext sub-titles are displayed against a black background and hence the signals R', G', and B' will be at the blanking level when character pixels are not being displayed. Hence using the signal VDS to operate switches SR1, SG1, and SB1 at a rate such as that of the pixel clock will cause some pixels to appear black and others to display picture information. This gives the appearance of reduced contrast and causes the character display to become more distinct. It is not essential, however, to switch these pixels to blanking level; they could alternatively be switched to any background color although this will give a color cast to the picture seen through the gaps between the switched pixels.

The predetermined pattern is arranged to produce a fine mesh of blanked (or background color) pixels to give the impression of reduced contrast over the area surrounding the text. It is believed that the finer the mesh the more acceptable the effect becomes. There are a number of alternative predetermined patterns which may be used and their selection may be based on the picture scanning arrangements. If the pattern is produced by blanking alternate pixels on each line, this gives a fine pattern on the horizontal or line scan direction. In order to produce an equivalent resolution pattern in the vertical or field scan direction the blanked pixels should alternate on successive lines of a frame. This pattern is advantageous for a non-interlaced display but has disadvantages when applied to an interlaced display. The reason is that since alternate lines are displayed in each field vertical lines of blanked pixels are formed in each field. These vertical lines are offset horizontally from one field to the next and for a 50 Hz field rate causes flickering vertical lines to be perceived at 25 Hz. Such flickering is noticeable to the viewer and can be annoying.

An alternative arrangement is to alternate the blanked pixel positions in successive lines of each field scan rather than successive lines of each frame scan. This reduces the vertical resolution of the mesh since pairs of identically blanked interlaced lines are produced. It does, however, produce a more acceptable effect for an interlaced display than the alternation of pixel blanking positions over successive frame lines as it eliminates the flickering vertical lines.

Figure 3:
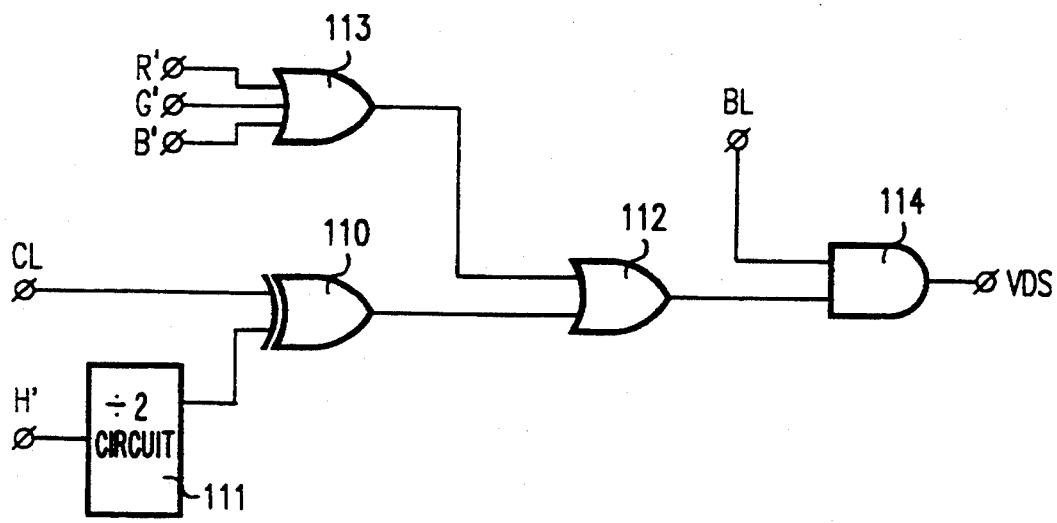
FIG. 3 shows a circuit for generating the control signal for the switches forming part of the video output circuit of FIG. 2.

FIG. 3 shows a circuit arrangement for generating the signal VDS from signals which are available within a teletext decoder. As shown in FIG. 3 a clock signal CL at the pixel rate is applied to a first input of an exclusive OR gate 110. A pulse H' at line scan frequency is applied to a divider by-two circuit 111 whose output is connected to a second input of the exclusive OR gate 110. The output of the exclusive OR gate 110 is connected to a first input of an OR gate 112. The three color signals R', G', and B' are connected to respective inputs of an OR gate 113 whose output is connected to a second input of the OR gate 112. The output of OR gate 113 is connected to a first input of an AND gate 114 while a signal BL is applied to a second input of the AND gate 114. The signal BL is the signal normally produced by the teletext decoder to cause the video output circuit 4 to select between the display of picture and text. The output of the AND gate 114 provides the signal VDS.

The circuit arrangement shown in FIG. 3 will produce an output VDS which will cause text to be displayed whenever R', G', or B' has a non zero value and text mode is selected that is the signal BL is active. If R', G' and B' are zero and BL is active then the signal VDS will be switched at the pixel rate and because of the line pulse input H' and divide-by-two circuit the signal VDS will be inverted on alternate lines of each field. Thus the mesh pattern desired for interlaced scanning as described above will be produced.

It will be apparent to the persons skilled in the art that other logic circuitry may be provided which will generate other patterns of pixel blanking or which may switch to any desired background color and that the rate of switching depends only on the frequency of the clock signal CL.

In a receiver which has an on-screen display message facility but no teletext decoder the micro processor producing the on-screen message display can be arranged to produce a similar switching waveform to enable the on-screen display messages to be superimposed on the displayed picture in a similar manner; either by the provision of appropriate software or an externally provided logic circuit. In a receiver with both an on-screen display message capability and a teletext decoder these functions may be combined in that a single microprocessor may be utilised for both on-screen display and teletext, the same control circuitry being used for the two facilities.

From reading the present disclosure, other modifications will be apparent to persons skilled in the art. Such modifications may involve other features which are already known in the design, manufacture and use of television receivers including teletext decoders and/or on-screen display message generators and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A television receiver for receiving a video signal and displaying a corresponding television picture, comprising:
   means for superimposing text on the television picture, the text being contained within a predetermined area of the television picture; and
   contrast reducing means for reducing the perceived picture contrast within portions of the predetermined area where text pixels are not being displayed, the perceived picture contrast being reduced by displaying a predetermined pattern of alternating unreduced-contrast pixels of the received video signal and pixels having a constant background color different from the text color.

2. A television receiver as claimed in claim 1 wherein the constant background color is black.

3. A television receiver as claimed in claim 1 wherein the predetermined pattern is a pluralilty of squares in a checker board pattern.

4. A television receiver as claimed in claim 3 in which each square of the checker board pattern is formed by a single pixel.

5. A television receiver as claimed in claim 1 wherein the text is a subtitle transmitted as a data signal during blanking intervals in the television signal, the receiver further including decoding means for decoding the data signals, wherein the text forming the sub-title is contained within a defined area and the contrast reducing means reduces the contrast of the received picture within the defined area.

6. A television receiver as claimed in claim 1, in which the superimposed text is an on-screen display message generated within the receiver, the on-screen display message being displayed within the predetermined area.

7. A television receiver as claimed in claim 2, wherein the predetermined pattern is a plurality of squares in a checker board pattern.

8. A television receiver as claimed in claim 2 wherein the text is a subtitle transmitted as a data signal during blanking intervals in the television signal, the receiver further including decoding means for decoding said data signals, wherein the text forming the sub-title is contained within a defined area and the contrast reducing means reduces the contrast of the received picture within the defined area.

9. A television receiver as claimed in claim 3 wherein the text is a subtitle transmitted as a data signal during blanking intervals in the television signal, the receiver further including decoding means for decoding said data signals, wherein the text forming the sub-title is contained within a defined area and the contrast reducing means reduces the contrast of the received picture within the defined area.

10. A television receiver as claimed in claim 4 wherein the text is a subtitle transmitted as a data signal during blanking intervals in the television signal, the receiver further including decoding means for decoding said data signals, wherein the text forming the sub-title is contained within a defined area and the contrast reducing means reduces the contrast of the received picture within the defined area.

11. A television receiver as claimed in claim 2, in which the superimposed text is an on-screen display message generated within the receiver, the on-screen display message being displayed within the predetermined area.

12. A television receiver as claimed in claim 3, in which the superimposed text is an on-screen display message generated within the receiver, the on-screen display message being displayed within the predetermined area.

13. A television receiver as claimed in claim 4, in which the superimposed text is an on-screen display message generated within the receiver, the on-screen display message being displayed within the predetermined area.

* * * * *